US011480478B2

(12) United States Patent
Khaled

(10) Patent No.: US 11,480,478 B2
(45) Date of Patent: Oct. 25, 2022

(54) TEMPERATURE ESTIMATION FOR SENSOR

(71) Applicant: CUMMINS EMISSION SOLUTIONS INC., Columbus, IN (US)

(72) Inventor: Nassim Khaled, Decatur, GA (US)

(73) Assignee: Cummins Emission Solutions Inc., Columbus, IN (US)

( * ) Notice: Subject to any disclaimer, the term of this patent is extended or adjusted under 35 U.S.C. 154(b) by 666 days.

(21) Appl. No.: 16/464,428

(22) PCT Filed: Nov. 28, 2017

(86) PCT No.: PCT/US2017/063491
§ 371 (c)(1),
(2) Date: May 28, 2019

(87) PCT Pub. No.: WO2018/102306
PCT Pub. Date: Jun. 7, 2018

(65) Prior Publication Data
US 2020/0340866 A1    Oct. 29, 2020

Related U.S. Application Data

(60) Provisional application No. 62/428,065, filed on Nov. 30, 2016.

(51) Int. Cl.
*G01K 1/08* (2021.01)
*G01K 15/00* (2006.01)
*F01N 9/00* (2006.01)

(52) U.S. Cl.
CPC ........... *G01K 15/005* (2013.01); *F01N 9/005* (2013.01); *G01K 1/08* (2013.01)

(58) Field of Classification Search
CPC ...... G01K 15/005; G01K 15/00; G01K 17/00; G01K 2205/04; G01K 7/16; G01K 13/02;
(Continued)

(56) References Cited

U.S. PATENT DOCUMENTS 6,341,257 B1 * 1/2002 Haaland .................... G01J 3/28
702/22
7,467,628 B2    12/2008 Adams et al.
(Continued)

FOREIGN PATENT DOCUMENTS

CN    102016247 A *  4/2011 ........... F02D 41/029
CN    109983207 A *  7/2019 .............. F01N 11/00
(Continued)

OTHER PUBLICATIONS

International Search Report and Written Opinion from corresponding PCT Application No. PCT/US2017/063491, dated Feb. 6, 2018, pp. 1-8.

*Primary Examiner* — Gail Kaplan Verbitsky
(74) *Attorney, Agent, or Firm* — Foley & Lardner LLP

(57) ABSTRACT

A process for controlled heating of a sensor of an aftertreatment system comprising accessing several parameters, including an exhaust mass flow, an outlet temperature, an ambient air temperature, and an ambient air velocity, calculating a temperature of the sensor based on a thermal model and the accessed parameters, comparing the calculated temperature to a threshold temperature, and activating a controlled heating process for the sensor responsive to the calculated temperature being below the threshold temperature. The controlled heating process can include activating a heater to heat the sensor.

18 Claims, 6 Drawing Sheets

(58) Field of Classification Search
CPC .. G01K 13/024; G01K 2205/00; G01K 7/427; G01K 1/08; F01N 9/005; F02B 37/00; F02B 29/0406; F02M 26/05; F02M 26/25; B01J 23/40; B01J 29/00
USPC .......................... 374/1, 141, 144, 45, 29, 30
See application file for complete search history.

(56) References Cited

U.S. PATENT DOCUMENTS

| | | | |
|---|---|---|---|
| 11,066,973 B2 * | 7/2021 | Prevot | F01N 3/2896 |
| 2004/0086023 A1 | 5/2004 | Smith et al. | |
| 2009/0095556 A1 | 4/2009 | Eifert et al. | |
| 2009/0326884 A1 | 12/2009 | Amemiya et al. | |
| 2016/0061079 A1 * | 3/2016 | Wentzel | F01N 3/208 60/274 |
| 2016/0177799 A1 * | 6/2016 | Cassidy | F01N 13/148 60/301 |
| 2016/0290260 A1 * | 10/2016 | Marlett | F02D 41/1494 |
| 2018/0340460 A1 * | 11/2018 | Srinivasan | F01N 3/035 |
| 2019/0155230 A1 * | 5/2019 | Culbertson | G05B 13/048 |
| 2020/0018208 A1 * | 1/2020 | Prevot | F01N 3/2066 |
| 2021/0372312 A1 * | 12/2021 | Light-Holets | F01N 3/208 |

FOREIGN PATENT DOCUMENTS

| | | | | |
|---|---|---|---|---|
| CN | 111159935 A | * | 5/2020 | |
| CN | 113486580 A | * | 10/2021 | |
| CN | 113513397 A | * | 10/2021 | |
| DE | 102008049925 A1 | * | 4/2010 | ......... F16L 13/0227 |
| DE | 102020101069 A1 | * | 7/2021 | ............ F01N 3/035 |
| GB | 1564560 A | * | 4/1980 | ........ B01D 53/9454 |
| JP | H05195758 A | * | 8/1993 | |
| JP | 2010-174657 A | | 8/2010 | |
| JP | 2011214560 A | * | 10/2011 | |
| JP | 2015527514 A | * | 9/2015 | |
| WO | WO-2018102306 A1 | * | 6/2018 | ............ F01N 9/005 |

* cited by examiner

TEMPERATURE ESTIMATION FOR SENSOR

CROSS REFERENCE TO RELATED APPLICATIONS

This application is the U.S. national stage of PCT Application No. PCT/US2017/063491, filed Nov. 28, 2017, which claims priority to and benefit of U.S. Provisional Patent Application No. 62/428,065, filed Nov. 30, 2016 and entitled "Temperature Estimation for Sensor," the entire disclosures of which are incorporated herein by reference.

TECHNICAL FIELD

The present application relates generally to the field of aftertreatment systems for internal combustion engines.

BACKGROUND

For internal combustion engines, such as diesel engines, nitrogen oxide ($NO_x$) compounds may be emitted in the exhaust. To reduce $NO_x$ emissions, a SCR process may be implemented to convert the $NO_x$ compounds into more neutral compounds, such as diatomic nitrogen, water, or carbon dioxide, with the aid of a catalyst and a reductant. The catalyst may be included in a catalyst chamber of an exhaust system, such as that of a vehicle or power generation unit. A reductant, such as anhydrous ammonia, aqueous ammonia, or urea, is typically introduced into the exhaust gas flow prior to the catalyst chamber. To introduce the reductant into the exhaust gas flow for the SCR process, an SCR system may dose or otherwise introduce the reductant through a dosing module that vaporizes or sprays the reductant into an exhaust pipe of the exhaust system up-stream of the catalyst chamber. The SCR system may include one or more sensors to monitor conditions within the exhaust system.

SUMMARY

Implementations described herein relate to temperature estimation of a sensor for an exhaust system, such as tip of a $NO_x$ sensor. One implementation relates to a process for controlled heating of a sensor of an aftertreatment system. The process includes accessing several parameters, including an exhaust mass flow, an outlet temperature, an ambient air temperature, and an ambient air velocity, calculating a temperature of the sensor based on a thermal model and the accessed parameters, comparing the calculated temperature to a threshold temperature, and activating a controlled heating process for the sensor responsive to the calculated temperature being below the threshold temperature. The controlled heating process may include activating a heater to heat the sensor. The threshold temperature can be selected based on potential dew formation.

In some implementations, the threshold temperature can be between 130 degrees Celsius and 160 degrees Celsius or between 140 degrees Celsius and 150 degrees Celsius. In some implementations, the thermal model includes a conductive heat transfer model when the exhaust mass flow is below a predetermined threshold. The conductive heat transfer model can include a heat power from an exhaust flow in the aftertreatment system, a heat power to the sensor, a radiation power to ambient, and a convection power to ambient. In some implementations, the thermal model includes a convective heat transfer model when the exhaust mass flow is above a predetermined threshold. The convective heat transfer model can include a heat power from an exhaust flow in the aftertreatment system, a heat power to an exhaust pipe, a radiation power to ambient, and a convection power to ambient. The process can include accessing a key-on parameter as an enablement condition. The thermal model can be based on a tuning calibration process to determine one or more calibration values for parameters of the thermal model.

Another implementation relates to a system that includes a sensor, a heater in thermal communication with the sensor, and a controller in electric communication with the sensor and the heater. The controller can be configured to access several parameters, including an exhaust mass flow, an outlet temperature, an ambient air temperature, and an ambient air velocity, calculate a temperature of the sensor based on a thermal model and the accessed parameters, compare the calculated temperature to a threshold temperature, and activate a controlled heating process for the sensor responsive to the calculated temperature being below the threshold temperature. The controlled heating process may include activating the heater to heat the sensor. The threshold temperature can be selected based on potential dew formation.

In some implementations, the threshold temperature can be between 130 degrees Celsius and 160 degrees Celsius or between 140 degrees Celsius and 150 degrees Celsius. In some implementations, the thermal model includes a conductive heat transfer model when the exhaust mass flow is below a predetermined threshold. The conductive heat transfer model can include a heat power from an exhaust flow in an aftertreatment system, a heat power to the sensor, a radiation power to ambient, and a convection power to ambient. In some implementations, the thermal model includes a convective heat transfer model when the exhaust mass flow is above a predetermined threshold. The convective heat transfer model can include a heat power from an exhaust flow in an aftertreatment system, a heat power to an exhaust pipe, a radiation power to ambient, and a convection power to ambient. The controller can be further configured to access a key-on parameter as an enablement condition. The thermal model can be based on a tuning calibration process to determine one or more calibration values for parameters of the thermal model.

A further implementation relates to a process for calibrating one or more parameters values for a thermal model. The process includes setting one or more constraints on one or more physical parameters or tunable parameters of an aftertreatment system having a sensor, generating a latin hypercube set of calibrations, simulating each of calibration of the generated latin hypercube set of calibrations, and generating calibration values for the parameters for the thermal model based on the simulated calibrations.

In some implementations, simulating each of calibration of the generated latin hypercube set of calibrations can be performed in parallel.

BRIEF DESCRIPTION

The details of one or more implementations are set forth in the accompanying drawings and the description below. Other features, aspects, and advantages of the disclosure will become apparent from the description, the drawings, and the claims, in which:

Figure 1:
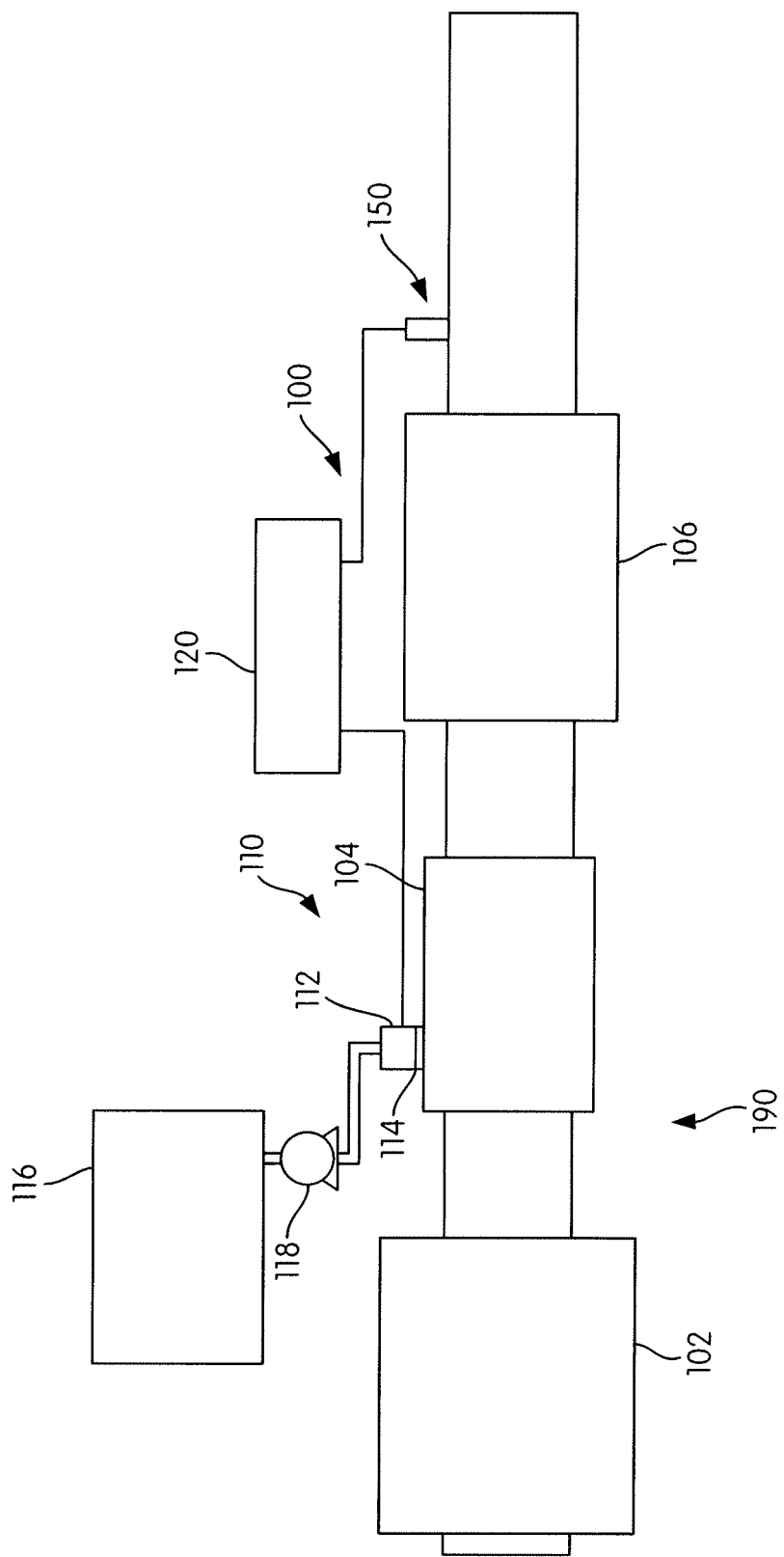
FIG. 1 is a block schematic diagram of an example selective catalytic reduction system having an example reductant delivery system for an exhaust system.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for temperature estimation of a sensor for an exhaust system. The various concepts introduced above and discussed in greater detail below may be implemented in any of numerous ways, as the described concepts are not limited to any particular manner of implementation. Examples of specific implementations and applications are provided primarily for illustrative purposes.

I. Overview

In some exhaust systems, a sensor module may be located downstream of an SCR catalyst to detect one or more emissions in the exhaust flow after the SCR catalyst. For example, a $NO_x$ sensor, a CO sensor, and/or a particulate matter sensor may be positioned downstream of the SCR catalyst to detect $NO_x$, CO, and/or particulate matter within the exhaust gas exiting the exhaust of the vehicle. Such emission sensors may be useful to provide feedback to a controller to modify an operating parameter of the aftertreatment system of the vehicle. For example, a $NO_x$ sensor may be utilized to detect the amount of $NO_x$ exiting the vehicle exhaust system and, if the $NO_x$ detected is too high or too low, the controller may modify an amount of reductant delivered by a dosing module. A CO and/or a particulate matter sensor may also be utilized as well.

The foregoing sensors include components, such as tips, inlet pipes, etc. that sample the exhaust gas from the exhaust system for the sensor to detect the amount and/or presence of $NO_x$, CO, and/or particulate matter within the exhaust gas. Such components positioned within the exhaust system are exposed to high temperatures of the exhaust gas during operation of the exhaust system. However, when the exhaust system is not in operation, such as when an engine fluidly coupled to the exhaust system is off, then the sensor and the associated components exposed to the exhaust gas in the exhaust system may cool to ambient temperature. As the exhaust system vents to atmosphere, the ambient conditions, such as humidity, dew point, etc. may also be present within the exhaust system and, in particular, present for the sensor and the associated components exposed to the exhaust gas in the exhaust system. When the exhaust system is operational, such as when an engine in fluid communication with the exhaust system is running, then the temperature of the sensor and the associated components exposed to the exhaust gas in the exhaust system are heated by the exhaust gas flowing through the exhaust system. In the sensor and/or the associated components a rapid increase or decrease in temperature may result in thermal shock and failure of the component, such as cracking of a tip and/or casing of the sensor, due to dew formation and rapidly transitioning to the gas phase on and/or within the sensor. Such failures of the sensor and/or component may result in incorrect detection or readings by the sensor, which may then need to be repaired and/or replaced.

In some implementations, a controller may control a heater for the sensor to increase and/or control the decrease of temperature of the sensor and/or the associated components. The heater may be internal to the sensor. The controller may control the heater to increase the temperature of the sensor and/or associated components exposed to the exhaust gas in the exhaust system in a controlled manner such that instances of thermal shock may be reduced. That is, the controller may operate the heater of the sensor such that the temperature of the sensor and/or associated components gradually increases to a predetermined or operating temperature.

In some implementations, the control of the heater may be based on a temperature of the sensor and/or an associated component of the sensor. The temperature, such as a tip temperature, may be used by the controller to estimate whether the sensor and/or associated components are above or below a threshold dew point value for controlling a dew point heating strategy for the sensor. That is, if the temperature of the sensor and/or associated component is below a predetermined threshold value, then a controlled heating process may be implemented to eliminate any potential dew formed on or within the sensor and/or associated component. If the temperature of the sensor and/or associated component is at and/or above the predetermined threshold value, then the controlled heating process may not be implemented. In some instances, two or more predetermined threshold values may be used. A first predetermined threshold value may correspond to an initial transition point and a second predetermined threshold value may correspond to a second transition point. The initial transition point may be selected based on a lower temperature at which dew is unlikely to form, but may account for potential temperature estimation errors. The second transition point may be selected based on a higher temperature at which dew is unlikely to form and is sufficiently high enough such that potential temperature estimation errors would still result in the temperature being high enough that dew is unlikely to form.

In some implementations, the tip temperature may be based on an ambient temperature and a temperature within the exhaust system, such as a SCR out temperature. The ambient temperature and the SCR out temperature may be used with a look-up table to determine a parameter indicative of an estimated tip temperature. Such an implementation may not account for the exhaust flow velocity and/or other exhaust flow conditions within the exhaust system, which can affect the tip temperature. Accordingly, a physics based modelling of the tip temperature may provide a more accurate tip temperature estimation. A more accurate tip temperature estimation may be used to control the heating and/or controlled cooling of the sensor and/or associated components to reduce instances of thermal shock.

II. Overview of Aftertreatment System

FIG. 1 depicts an aftertreatment system 100 having an example reductant delivery system 110 for an exhaust system 190. The aftertreatment system 100 includes a particulate filter, for example a diesel particulate filter (DPF) 102, the reductant delivery system 110, a decomposition chamber or reactor pipe 104, a SCR catalyst 106, and a sensor 150.

The DPF 102 is configured to remove particulate matter, such as soot, from exhaust gas flowing in the exhaust system 190. The DPF 102 includes an inlet, where the exhaust gas is received, and an outlet, where the exhaust gas exits after having particulate matter substantially filtered from the exhaust gas and/or converting the particulate matter into carbon dioxide.

The decomposition chamber 104 is configured to convert a reductant, such as urea, aqueous ammonia, or diesel exhaust fluid (DEF), into ammonia. The decomposition chamber 104 includes a reductant delivery system 110 having a dosing module 112 configured to dose the reductant into the decomposition chamber 104. In some implementations, the reductant is injected upstream of the SCR catalyst 106. The reductant droplets then undergo the processes of evaporation, thermolysis, and hydrolysis to form gaseous ammonia within the exhaust system 190. The decomposition chamber 104 includes an inlet in fluid communication with the DPF 102 to receive the exhaust gas containing $NO_x$ emissions and an outlet for the exhaust gas, $NO_x$ emissions, ammonia, and/or remaining reductant to flow to the SCR catalyst 106.

The decomposition chamber 104 includes the dosing module 112 mounted to the decomposition chamber 104 such that the dosing module 112 may dose the reductant into the exhaust gases flowing in the exhaust system 190. The dosing module 112 may include an insulator 114 interposed between a portion of the dosing module 112 and the portion of the decomposition chamber 104 to which the dosing module 112 is mounted. The dosing module 112 is fluidly coupled to one or more reductant sources 116. In some implementations, a pump 118 may be used to pressurize the reductant from the reductant source 116 for delivery to the dosing module 112.

The dosing module 112 and pump 118 are also electrically or communicatively coupled to a controller 120. The controller 120 is configured to control the dosing module 112 to dose reductant into the decomposition chamber 104. The controller 120 may also be configured to control the pump 118. The controller 120 may include a microprocessor, an application-specific integrated circuit (ASIC), a field-programmable gate array (FPGA), etc., or combinations thereof. The controller 120 may include memory which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), erasable programmable read only memory (EPROM), flash memory, or any other suitable memory from which the controller 120 can read instructions. The instructions may include code from any suitable programming language.

Figure 5:
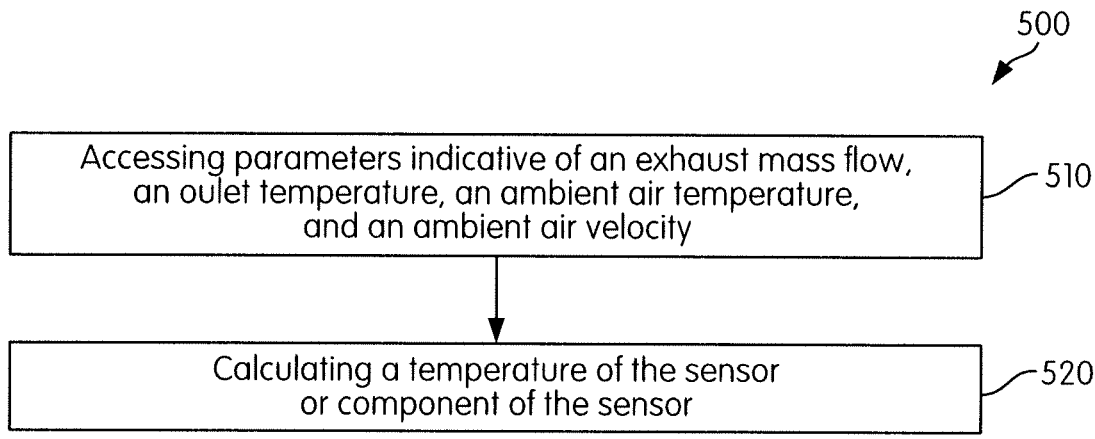
FIG. 5 is a process diagram of an implementation of a process for determining a temperature of a sensor or component of a sensor.
Figure 6:
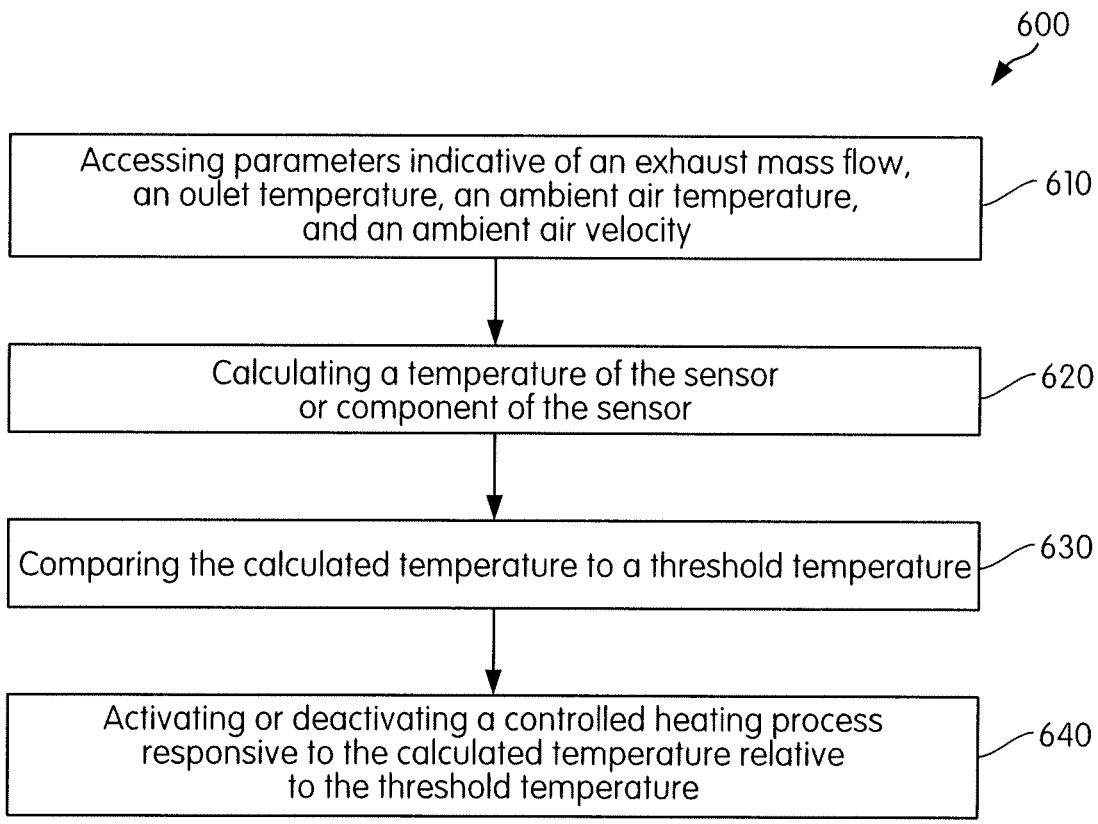
FIG. 6 is a process diagram for activating a controlled heating process responsive to a temperature of a sensor or component of a sensor.

In certain implementations, the controller 120 is structured to perform certain operations, such as those described herein in relation to FIGS. 5-6. In certain implementations, the controller 120 forms a portion of a processing subsystem including one or more computing devices having memory, processing, and communication hardware. The controller 120 may be a single device or a distributed device, and the functions of the controller 120 may be performed by hardware and/or as computer instructions on a non-transient computer readable storage medium.

In certain implementations, the controller 120 includes one or more modules structured to functionally execute the operations of the controller 120. In certain implementations, the controller 120 may include a controlled heating process module implementing the process described in reference to FIGS. 5-6. The description herein including modules emphasizes the structural independence of the aspects of the controller 120 and illustrates one grouping of operations and responsibilities of the controller 120. Other groupings that execute similar overall operations are understood within the scope of the present application. Modules may be implemented in hardware and/or as computer instructions on a non-transient computer readable storage medium, and modules may be distributed across various hardware or computer based components. More specific descriptions of certain embodiments of controller operations are included in the section referencing FIGS. 5-6.

Example and non-limiting module implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The SCR catalyst 106 is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR catalyst 106 includes inlet in fluid communication with the decomposition chamber 104 from which exhaust gas and reductant is received and an outlet in fluid communication with an end of the exhaust system 190.

The exhaust system 190 may further include an oxidation catalyst, for example a diesel oxidation catalyst (DOC), in fluid communication with the exhaust system 190 (e.g., downstream of the SCR catalyst 106 or upstream of the DPF 102) to oxidize hydrocarbons and carbon monoxide in the exhaust gas.

In some implementations, the DPF 102 may be positioned downstream of the decomposition chamber or reactor pipe 104. For instance, the DPF 102 and the SCR catalyst 106 may be combined into a single unit, such as a DPF with SCR-coating (SDPF). In some implementations, the dosing module 112 may instead be positioned downstream of a turbocharger or upstream of a turbocharger.

The sensor 150 may be coupled to the exhaust system 190 to detect a condition of the exhaust gas flowing through the exhaust system 190. In some implementations, the sensor 150 may have a portion disposed within the exhaust system 190, such as a tip of the sensor 150 may extend into a portion of the exhaust system 190. In other implementations, the sensor 150 may receive exhaust gas through another conduit, such as a sample pipe extending from the exhaust system 190. While the sensor 150 is depicted as positioned downstream of the SCR catalyst 106, it should be understood that the sensor 150 may be positioned at any other position of the exhaust system 190, including upstream of the DPF 102, within the DPF 102, between the DPF 102 and the decomposition chamber 104, within the decomposition chamber 104, between the decomposition chamber 104 and the SCR catalyst 106, within the SCR catalyst 106, or downstream of the SCR catalyst 106. In addition, two or more sensors 150 may be utilized for detecting a condition of the exhaust gas, such as two, three, four, five, or six sensors 150 with each sensor 150 located at one of the foregoing positions of the exhaust system 190.

III. Example Sensor Temperature Estimation Implementation

In some implementations, determining or estimating a temperature of a sensor and/or a component of a sensor may be used during operation of the engine and/or exhaust system. For instance, the temperature of the sensor and/or a component thereof may be used for controlled heating and/or cooling of the sensor and/or component to reduce a likelihood of thermal shock. Thermal shock may occur due to dew forming on and/or within the sensor and/or component of the sensor. Such dew may occur when the engine and/or exhaust system is initially started when the sensor and/or component of the sensor has a reduced temperature relative to the exhaust gas temperature. The dew may condense on and/or within the sensor and/or a component of the sensor (e.g., a sensor tip) as a result of the reduced temperature relative to the exhaust gas and/or other components within the exhaust system. Moreover, the sensor and/or component thereof may be positioned within a collection device, such as an exhaust gas sample collection tube, that may further reduce the rate at which the temperature of the sensor and/or the component thereof increases relative to the exhaust gas. If the temperature of the sensor and/or component thereof is rapidly changed, such as from the formation of dew and/or rapid heating or cooling of the sensor and/or a component thereof, then thermal shock may occur, which may result in damage to the sensor and/or the component thereof.

A controller may control a heater for the sensor to increase and/or control the decrease of temperature of the sensor and/or an associated component. The heater may be internal to the sensor. The controller may control the heater to increase the temperature of the sensor and/or associated components exposed to the exhaust gas in the exhaust system in a controlled manner such that instances of thermal shock may be reduced. That is, the controller may operate the heater of the sensor such that the temperature of the sensor and/or associated components increases to a predetermined or operating temperature to reduce dew formation and/or evaporate dew. In some implementations, control of the heater may be based on a temperature of the sensor and/or an associated component of the sensor. The temperature, such as a tip temperature, may be used by the controller to estimate whether the sensor and/or associated components are above or below a threshold dew point value for controlling a dew point heating strategy for the sensor. That is, if the temperature of the sensor and/or associated component is below a predetermined threshold value, then a controlled heating process may be implemented to reduce dew formation or eliminate any potential dew formed on or within the sensor and/or associated component. If the temperature of the sensor and/or associated component is at and/or above the predetermined threshold value, then the controlled heating process may not be implemented.

In some instances, two or more predetermined threshold values may be used. A first predetermined threshold value may correspond to an initial transition point and a second predetermined threshold value may correspond to a second transition point. The initial transition point may be selected based on a lower temperature at which dew is unlikely to form, but may account for potential temperature estimation errors. The second transition point may be selected based on a higher temperature at which dew is unlikely to form and is sufficiently high enough such that potential temperature estimation errors would still result in the temperature being high enough that dew is unlikely to form.

Increasing an accuracy of a temperature determination or estimation for the sensor and/or associated component may reduce the likelihood of thermal shock. Accordingly, described herein are implementations for utilizing a physics based determination and/or estimation of a temperature of the sensor and/or a component thereof, such as a sensor tip. The physics based determination may utilize additional exhaust flow parameters and/or component parameters to increase the accuracy of the tip temperature determination or estimation.

Figure 2:
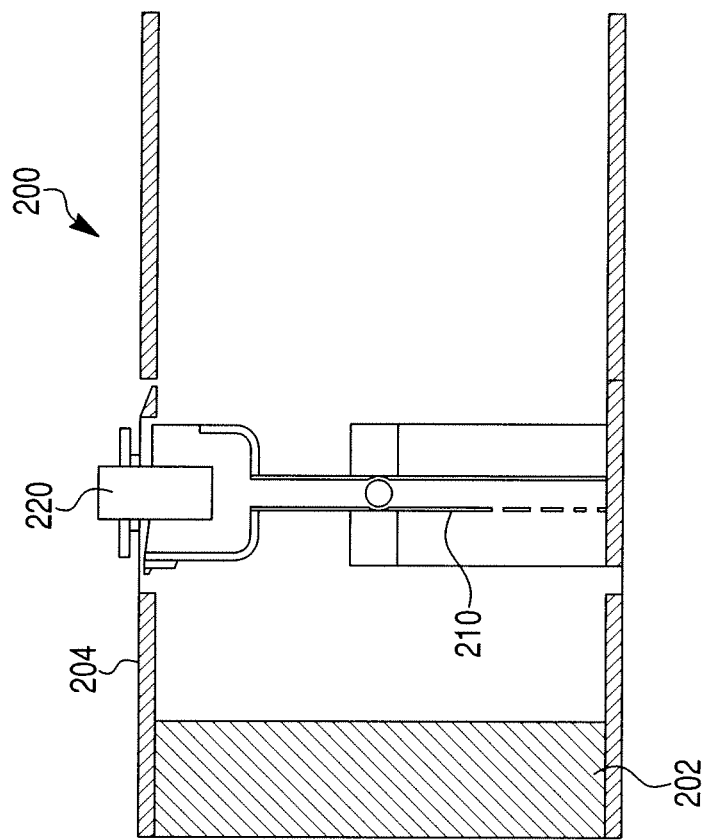
FIG. 2 is a side cross-sectional view of a sensor assembly positioned within an example exhaust system.

FIG. 2 depicts a portion of an implementation of an exhaust system 200 having a component 202, such as an SCR catalyst, positioned within a housing 204 and upstream of a sensor assembly 210. The sensor assembly 210 includes a sensor 220 positioned within a sample probe assembly of the sensor assembly 210. In some implementations, the sensor 220 may be positioned within the exhaust system without the sample probe assembly. The sensor 220 may comprise a $NO_x$ sensor, a CO sensor, a $NH_3$ sensor, an $O_2$ sensor, a particulate matter sensor, etc. In some implementations, the sensor 220 may include a sensor tip or other component that may be affected by thermal shock. The sensor 220 is configured to measure an amount and/or detect a presence of a component of the exhaust gas that is of interest, such as $NO_x$, CO, particulate matter, $NH_3$, etc. The sensor probe assembly may be excluded in some implementations, such as when the sensor 220 is mounted to a sidewall of the exhaust system 200. In other implementations, different sensor probe assemblies with the sensor 220 may be utilized.

Figure 3:
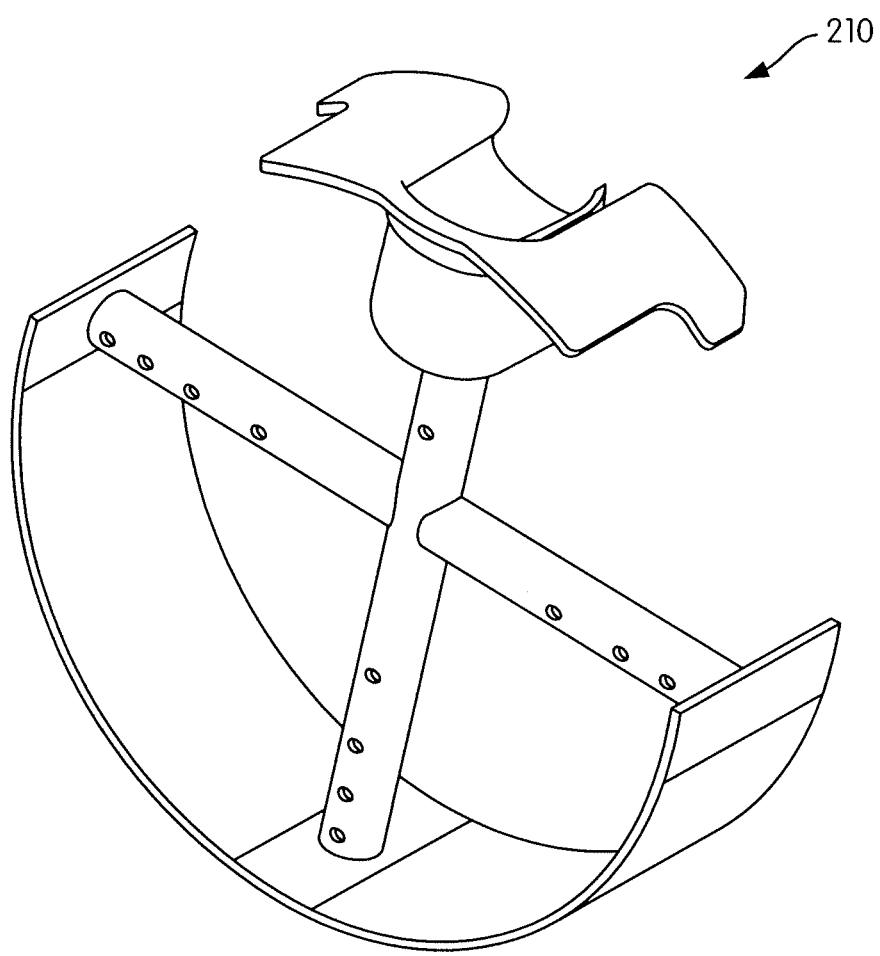
FIG. 3 is a perspective view of the sensor assembly of FIG. 2.

FIG. 3 depicts an implementation of the sensor assembly 210 with the sensor 220 excluded. As can be seen, the sample probe assembly of the sensor assembly 210 includes at least two sample arms which are coupled together at a central portion and extend radially outward from the central portion to an outward end. The outward end may be coupled to either a fairing, which can be arcuate shaped. The fairing may be attached to an interior surface of the housing 204 of FIG. 2, which defines a fluid conduit of the exhaust system into which the sensor assembly 210 is installed.

Each sample arm may be defined as either a single flow sample arm or an aggregate flow sample arm. Generally, sample portions of the captured fluid entering the single flow sample arms flow into and combine with sample portions entering and flowing through the aggregate flow sample arm. The sample probe assembly of the sensor assembly 210 includes one aggregate flow sample arm and three single flow sample arms, with the four arms being equally angularly-spaced apart from each other. However, in other embodiments, the sample probe assembly of the sensor assembly 210 can include fewer or more than four arms, with the arms being equally angularly-spaced apart from each other or with different angular intervals between the arms.

The sample arms are hollow and each include a fluid flow channel formed therein. The fluid flow channel of each sample arm can have any of various cross-sectional shapes, such as, for example, circular, elliptical, triangular, polygonal, and the like. The sample arms each include a set of inlet apertures through which a sample portion of a main fluid flow is captured and directed into the fluid flow channels of the sample arms. The inlet apertures can be formed in respective upstream facing surfaces of the sample arms such that each of the inlet apertures faces an upstream direction (i.e., normal to a fluid flow direction). In other words, the central axes of the inlet apertures are substantially parallel to the fluid flow direction. In alternative embodiments, however, the inlet apertures can also be angled into the side (or top and bottom) surfaces of the sample arms as well as in other non-normal locations/orientations as may be deemed appropriate. For example, in such alternative embodiments, the apertures face directions angled with respect to the fluid flow direction. In other words, the central axes of the angled inlet apertures are substantially non-parallel to the fluid flow direction.

Further, the inlet apertures of a respective sample arm are radially aligned along the respective arm from a location proximate a center portion of the sample arm to a location near or proximate the radially outward end of the sample arm. In the illustrated embodiment, each single flow sample arm includes four inlet apertures while the aggregate flow sample arm includes a single inlet aperture. However, in other embodiments, each sample arm may include fewer or more inlet apertures. As shown, the inlet apertures are substantially circular-shaped. However, in other embodiments, the inlet apertures can have other shapes, such as polygonal, elliptical, rectangular, triangular, and the like.

The sample probe assembly of the sensor assembly 210 further includes a sensor well that is located at the outward end of the aggregate flow sample arm. The sensor well is a blunt, rounded body that encloses an interior volume in fluid communication with the fluid flow channel formed into the aggregate flow sample arm. The sensor well includes an outer portion, which opens to an interior surface of the fluid conduit or housing to which the sensor 220 is installed. The sensor well may include a front portion having a blunt, rounded surface for diverting the fluid flowing through the fluid conduit around the sensor well.

Figure 4:
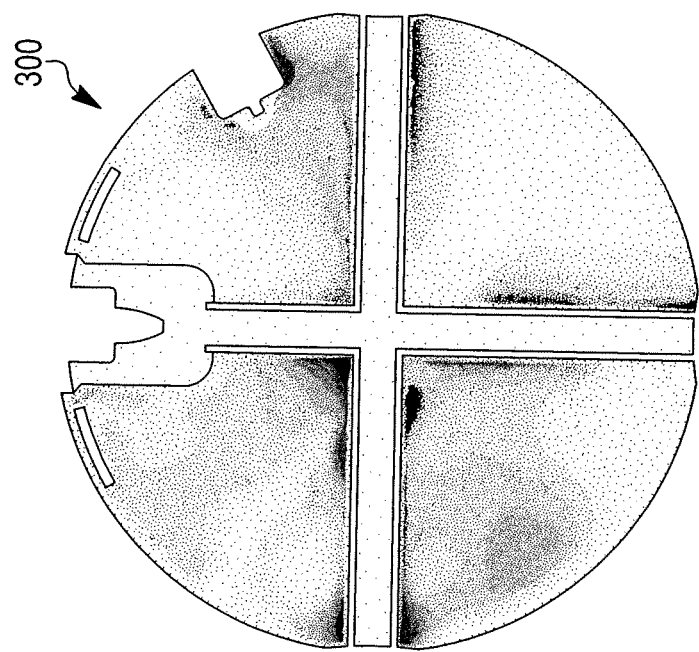
FIG. 4 is a cross-sectional flow velocity profile of the sensor assembly of FIG. 2 showing a flow velocity profile outside and inside the sensor assembly.

The sensor assembly 210 is installed within the fluid conduit or housing 204 such that fluid flowing through the conduit either passes between the sample arms as the main fluid flow, or into the inlet apertures and through the interior passages of the sample probe assembly of the sensor assembly 210 as the sample portion of the fluid flow to the sensor 220. FIG. 4 depicts a flow velocity profile 300 of an example exhaust gas flow past the sensor assembly 210 within the housing 204 and within the sensor assembly 210.

FIG. 5 is a process diagram of an implementation of a process 500 for determining a temperature of a sensor or component of a sensor. The process 500 includes the steps of accessing parameters indicative of an exhaust mass flow, an outlet temperature, an ambient air temperature, and an ambient air velocity (block 510) and calculating a temperature of the sensor or component of the sensor (block 520). In some implementations, a key switch parameter may be utilized as an enablement condition for the process 500 to occur. That is, if a parameter indicative of a key-on or key switch on event is set to a value of 1, then the process 500 may proceed. If the parameter indicative of a key-on or key switch on event is set to a value of 0 or a non-1 value, then the process 500 ends or is not performed.

Accessing parameters indicative of an exhaust mass flow, an outlet temperature, an ambient air temperature, and an ambient air velocity (block 510) may include accessing a parameter value from a memory and/or other storage device, receiving a value from a sensor for the corresponding parameter, etc.

Calculating a temperature of the sensor or component of the sensor (block 520) utilizes the accessed parameters indicative of the exhaust mass flow, outlet temperature, ambient air temperature, and ambient air velocity to determine an estimated temperature of the sensor or component of the sensor. In some implementations, a first thermal model may be selected if the exhaust mass flow (i.e., the rate of exhaust mass flow) is above a predeteremined threshold value, and a second thermal model may be selected if the exhaust mass flow is not above the predeteremined threshold value. The predetermined threshold value may be an exhaust mass flow at an engine idle speed (i.e., the exhaust mass flow when an engine coupled to the exhaust system is idling). When the exhaust mass flow is above the predetermined threshold value, then heating of the sensor or component of the sensor may be based on convective heat transfer from the flowing exhaust gas to the sensor or component of the sensor. When the exhaust mass flow is below the predetermined threshold value, then heating of the sensor or component of the sensor may be based on conductive heat transfer from an exhaust pipe of the exhaust system to the sensor or component of the sensor. The first thermal model for the temperature of the sensor or a component of the sensor, such as the sensor tip can include the following: A heat power from the exhaust flow:

$$\dot{m}_{flow\_sensor} \times [C_{p\text{-}flow\text{-}in} \times T_{in} - C_{p\text{-}flow\text{-}out} \times T_{out}].$$

A heat power lost/gained from/to the sensor mass $$m_{sensor} \times C_{p\text{-}sensor} \times \dot{T}_{sensor}.$$

A radiation power (to ambient)

$$[T_{sensor}^4 - T_{ambient}^4] \times \text{surface\_area}_{sensor} \times 5.6697 \times 10^{-8} \times \text{emissivity}.$$

A convection power (to ambient)

$$[T_{sensor} - T_{ambient}] \times f(v_{air}).$$

Using the foregoing, an energy balance for a sensor tip may set as $$\dot{m}_{flow\_sensor} \times [C_{p\text{-}flow\text{-}in} \times T_{in} - C_{p\text{-}flow\text{-}out} \times T_{out}]$$

equal to $$m_{sensor} \times C_{p\text{-}sensor} \times \dot{T}_{sensor} + [T_{sensor}^4 - T_{ambient4}] \times \text{surface\_area}_{sensor} \times 5.6697 \times 10^{-8} \times \text{emissivity} + [T_{sensor} - T_{ambient}] \times f(v_{air})$$

where it is assumed that $T_{in} + T_{out} = 2 \ast T_{sensor}$. To solve the foregoing, the temperature out, $T_{out}$, needs to be set. Then, using accessed parameters (from block 510), the temperature of the sensor, $T_{sensor}$, can be calculated. The calculated temperature can then be used for controlling one or more processes, such as activating a controlled heating process for the sensor. Under the foregoing model, it is assumed that $T_{tip} = (T_{SCR\_out} + T_{tip\_out})/2$ when the engine speed is greater than idle where convection is the dominant heat transfer mode.

The second thermal model for the temperature of the sensor or a component of the sensor, such as the sensor tip can include the following: A heat power from the exhaust flow:

$$\dot{m}_{exhaust\_flow} \times \lfloor C_{p\text{-}flow\text{-}in} \times T_{in} - C_{p\text{-}flow\text{-}out} \times T_{out} \rfloor.$$

A heat power lost/gained from/to the exhaust pipe mass $$m_{pipe} \times C_{p\text{-}pipe} \times \dot{T}_{pipe}.$$

A radiation power (to ambient)

$$\lfloor T_{pipe}^4 - T_{ambient}^4 \rfloor \times \text{surface\_area}_{pipe} \times 5.6697 \times 10^{-8} \times \text{emissivity}.$$

A convection power (to ambient)

$$[T_{pipe} - T_{ambient}] \times f(v_{air}).$$

Using the foregoing, an energy balance for an exhaust pipe may set as $$\dot{m}_{exhaust\_flow} \times \lfloor C_{p\text{-}flow\text{-}in} \times T_{in} - C_{p\text{-}flow\text{-}out} \times T_{out} \rfloor$$

equal to $$m_{pipe} \times C_{p\text{-}pipe} \times T_{pipe} + [T_{pipe}^4 - T_{ambient}^4] \times \text{surface\_area}_{pipe} \times 5.6697 \times 10^{-8} \times \text{emissivity} + [T_{pipe} - T_{ambient}] \times f(v_{air})$$

where it is assumed that $T_{in} + T_{out} = 2 \cdot T_{pipe}$. To solve the foregoing, the temperature out, $T_{out}$, needs to be set. Then, using accessed parameters (from block 510), the temperature of the sensor, $T_{sensor}$, can be calculated as equal to the temperature of the exhaust pipe, $T_{pipe}$. The calculated temperature can then be used for controlling one or more processes, such as activating a controlled heating process for the sensor. Under the foregoing model, it is assumed that $T_{pipe} = (T_{SCR\text{-}out} + T_{pipe\text{-}out})/2$ when the engine speed is equal to or less than idle where conduction is the dominant heat transfer mode.

FIG. 6 depicts a process 600 for activating a controlled heating process responsive to a temperature of a sensor or component of the sensor. The process 600 includes accessing parameters indicative of an exhaust mass flow, an outlet temperature, an ambient air temperature, and an ambient air velocity (block 610), calculating a temperature of the sensor or component of the sensor (block 620), comparing the calculated temperature to a threshold temperature (block 630), and activating or deactivating a controlled heating process responsive to the calculated temperature relative to the threshold temperature (block 640). In some implementations, a key switch parameter may be utilized as an enablement condition for the process 600 to occur. That is, if a parameter indicative of a key-on or key switch on event is set to a value of 1, then the process 600 may proceed. If the parameter indicative of a key-on or key switch on event is set to a value of 0 or a non-1 value, then the process 600 ends or is not performed.

Accessing parameters indicative of an exhaust mass flow, an outlet temperature, an ambient air temperature, and an ambient air velocity (block 610) may include accessing a parameter value from a memory and/or other storage device, receiving a value from a sensor for the corresponding parameter, etc.

Calculating a temperature of the sensor or component of the sensor (block 620) utilizes the accessed parameters indicative of the exhaust mass flow, outlet temperature, ambient air temperature, and ambient air velocity to determine an estimated temperature of the sensor or component of the sensor. The calculated temperature can utilize the thermal model detailed above in reference to FIG. 5.

The process 600 further includes comparing the calculated temperature to a threshold temperature (block 630). If the calculated temperature of the sensor and/or associated component is below a predetermined threshold value, then a controlled heating process may be implemented to eliminate any potential dew formed on or within the sensor and/or associated component. If the temperature of the sensor and/or associated component is at and/or above the predetermined threshold value, then the controlled heating process may not be implemented. The predetermined temperature threshold value can be between 130 degrees Celsius and 160 degrees Celsius, between 140 degrees Celsius and 150 degrees Celsius, or can be 140 degrees Celsius or 150 degrees Celsius. In some instances, two or more predetermined threshold values may be used. A first predetermined threshold value may correspond to an initial transition point and a second predetermined threshold value may correspond to a second transition point. The initial transition point may be selected based on a lower temperature at which dew is unlikely to form, but may account for potential temperature estimation errors. The second transition point may be selected based on a higher temperature at which dew is unlikely to form and is sufficiently high enough such that potential temperature estimation errors would still result in the temperature being high enough that dew is unlikely to form. In some implementations, the initial transition point may be in a range from 130 degrees Celsius to 150 degrees Celsius, such as 140 degrees Celsius, and the second transition point may be in a range from 140 degrees Celsius to 160 degrees Celsius, such as 150 degrees Celsius. In some implementations, a flag value can also be monitored with the initial transition point threshold such that, if the calculated temperature is greater than the initial transition point temperature and the flag value is indicative of the controlled heating process being deactivated from a prior iteration, then the flag value may remain at the same value. If the flag value is indicative of the controlled heating process being activated from a prior iteration, then the flag value may remain at the same value.

The process 600 also includes activating or deactivating a controlled heating process responsive to the calculated temperature relative to the threshold temperature (block 640). If the calculated temperature is above the threshold temperature, then a controlled heating process can be activated. The controlled heating process may include activating a heater of the sensor and/or an external heater to heat the sensor. Activating or deactivating the controller heating process may include modifying a value for a control parameter, such as a 1 for deactivating the controlled heating process and a 0 for activating the controlled heating process.

Figure 7:
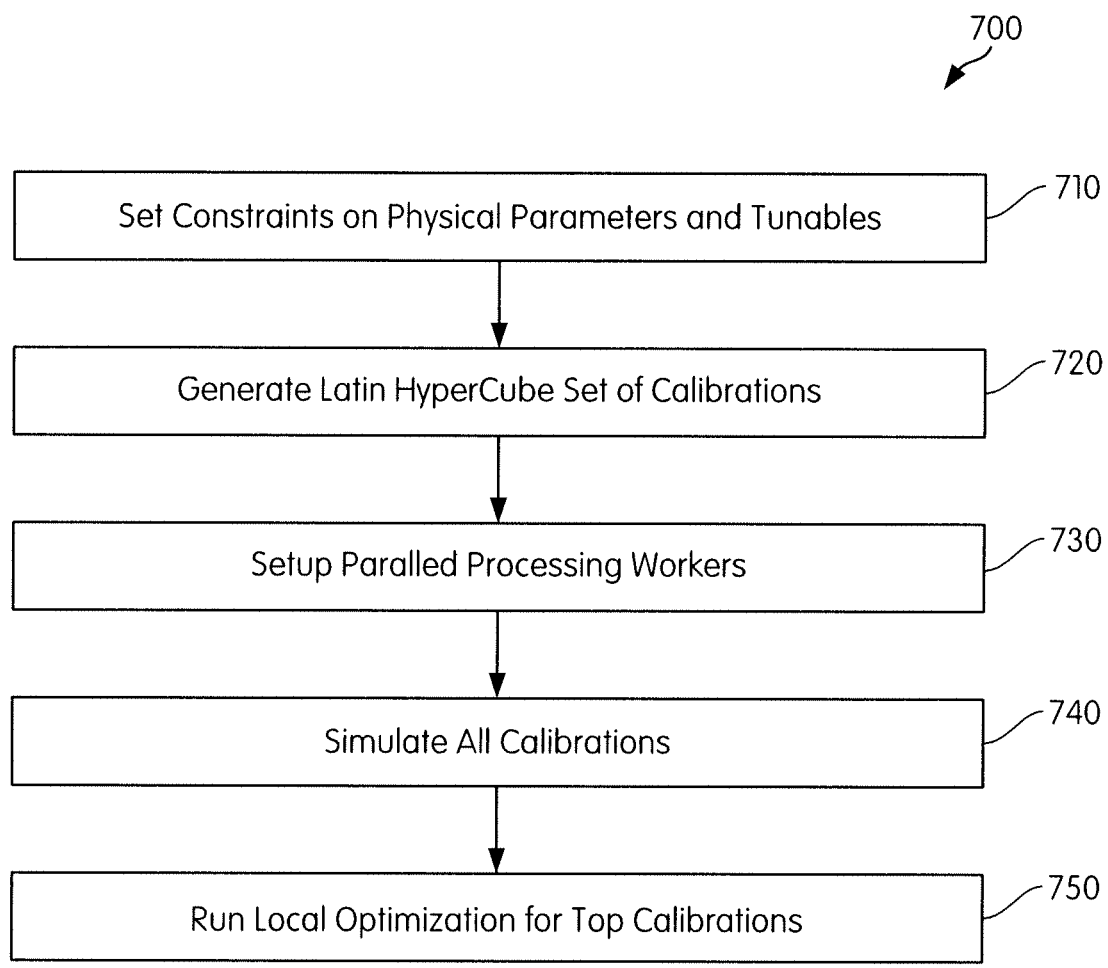
FIG. 7 is a process diagram for tuning a calibration for the process for determining the temperature of a sensor or component of a sensor of FIG. 5.

FIG. 7 depicts an example process 700 for tuning a calibration for the thermal model of process 500 of FIG. 5 for calculating a temperature of a sensor or component of the sensor. The process 700 includes setting constraints on physical parameters and tunables (block 710). The physical constraints may be properties of the material or component for the thermal model. The tunables may be other parameters that may be modified for the thermal model. Some implementations of constraints on physical properties and tunables may include setting a sensor tip surface area (m$^2$) less than 1, a sensor tip mass greater than 0.05 kg and less than 1, a sensor length (m) less than 2, $C_p$ of the sensor greater than 0.01 and less than 1 (KJ/kg*k), h of the sensor greater than 0.001 and less than 1 W/(m$^2$K), a sensor emissivity greater than 0.001 and less than 1, a flow fraction greater than 0.001 and less than 0.01. Some other implementations of constraints on physical properties and tunables may include setting an exhaust pipe surface area (m²) less than 1, a pipe mass greater than 0.05 kg and less than 1, a pipe length (m) less than 2, $C_p$ of the exhaust pipe greater than 0.01 and less than 1 (KJ/kg*k), h of the exhaust pipe greater than 0.001 and less than 1 W/(m²K), and an exhaust pipe emissivity greater than 0.001 and less than 1.

The process includes generating a latin hypercube set of calibrations (block 720), optionally setting up parallel processing workers (block 730), and simulating all calibrations (block 740). The top calibrations (e.g., based on a root mean squared error calculation) can be optimized (block 750) to generate calibration values for the parameters for the thermal model.

Figure 8:
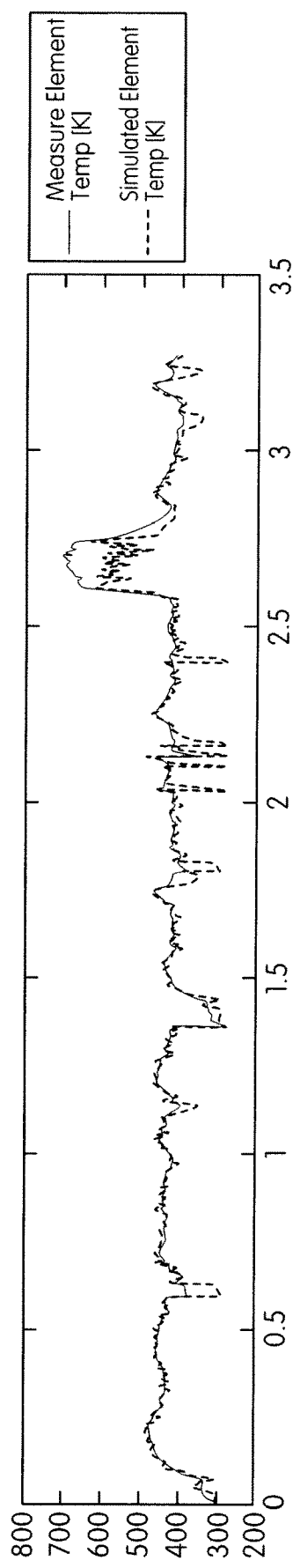
FIG. 8 is a graphical diagram depicting an estimated temperature implementing the process of FIG. 5 relative to a measured temperature.
Figure 9:
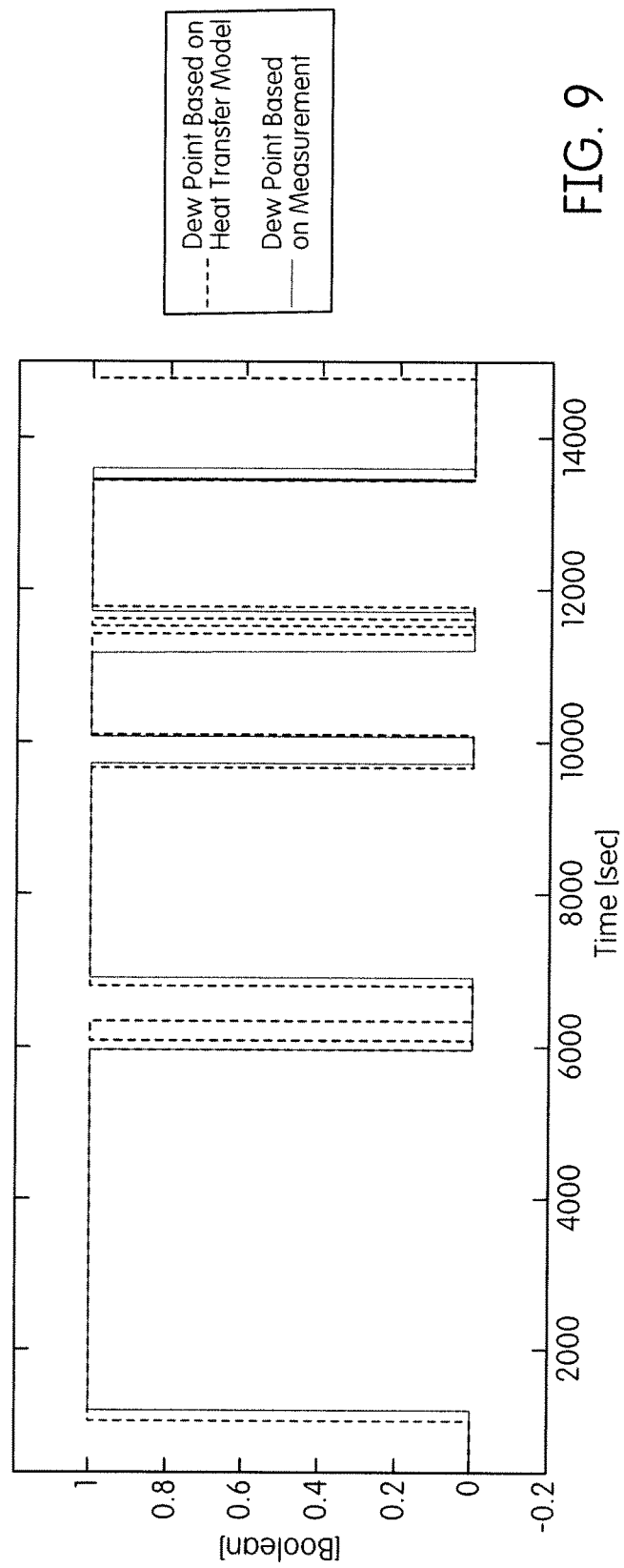
FIG. 9 is a graphical diagram depicting a control parameter for the controlled heating process of FIG. 6 for an estimated temperature implementing the process of FIG. 5 relative to a measured temperature.

FIG. 8 depicts a set of values calculated for a temperature of a sensor tip using the process 500 of FIG. 5 relative to a measured temperature and FIG. 9 depicts values for the control parameter, such as that described in reference to the process 600 of FIG. 6, using the calculated temperature.

The term "controller" encompasses all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code).

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, the separation of various system components in the implementations described above should not be understood as requiring such separation in all implementations, and it should be understood that the described components and systems can generally be integrated in a single product or packaged into multiple products embodied on tangible media.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims. Additionally, it is noted that limitations in the claims should not be interpreted as constituting "means plus function" limitations under the United States patent laws in the event that the term "means" is not used therein.

The terms "coupled," "connected," and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

The terms "fluidly coupled," "in fluid communication," and the like as used herein mean the two components or objects have a pathway formed between the two components or objects in which a fluid, such as water, air, gaseous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various exemplary implementations is illustrative only and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A process for controlled heating of a sensor of an aftertreatment system, the process comprising:
   accessing a plurality of parameters, the plurality of parameters comprising an exhaust mass flow, an outlet temperature, an ambient air temperature, and an ambient air velocity;
   calculating a temperature of the sensor based on a thermal model and the accessed plurality of parameters;
   comparing the calculated temperature to a threshold temperature, wherein the threshold temperature is between 130 degrees Celsius and 160 degrees Celsius; and
   activating a controlled heating process for the sensor responsive to the calculated temperature being below the threshold temperature, the controlled heating process comprising activating a heater to heat the sensor.

2. The process of claim 1, wherein the threshold temperature is between 140 degrees Celsius and 150 degrees Celsius.

3. The process of claim 1, wherein the thermal model comprises a conductive heat transfer model when the exhaust mass flow is below a predetermined threshold.

4. The process of claim 3, wherein conductive heat transfer model comprises a heat power from an exhaust flow in the aftertreatment system, a heat power to the sensor, a radiation power to ambient, and a convection power to ambient.

5. The process of claim 1, wherein thermal model comprises a convective heat transfer model when the exhaust mass flow is above a predetermined threshold.

6. The process of claim 5, wherein convective heat transfer model comprises a heat power from an exhaust flow in the aftertreatment system, a heat power to an exhaust pipe, a radiation power to ambient, and a convection power to ambient.

7. The process of claim 1 further comprising accessing a key-on parameter as an enablement condition.

8. The process of claim 1, wherein the thermal model is based on a calibration process to determine one or more calibration values for parameters of the thermal model.

9. The process of claim 8, wherein the calibration process comprises:
   setting one or more constraints on one or more physical parameters or tunable parameters of the aftertreatment system;
   generating a latin hypercube set of calibrations;
   simulating each calibration of the generated latin hypercube set of calibrations; and
   generating the one or more calibration values for the parameters for the thermal model based on the simulation.

10. The process of claim 9, wherein setting the one or more constraints comprises at least one of setting a sensor tip area of a senor of the aftertreatment system to less than 1 meter square, setting a sensor tip mass of the sensor to be greater than 0.05 kilograms and less than 1 kilogram, setting a sensor emissivity of the sensor to be greater than 0.001 and less than 1, setting an emissivity of an exhaust pipe of the aftertreatment system to be greater than 0.001 and less than 1, or setting a surface area of the exhaust pipe to be less than 1 meter square.

11. A system for controlled heating of a sensor of an aftertreatment system, comprising:
    a sensor;
    a heater in thermal communication with the sensor; and
    a controller in electric communication with the sensor and the heater, the controller configured to:
       access a plurality of parameters, the plurality of parameters comprising an exhaust mass flow, an outlet temperature, an ambient air temperature, and an ambient air velocity;
       calculate a temperature of the sensor based on a thermal model and the accessed plurality of parameters;
       compare the calculated temperature to a threshold temperature, wherein the threshold temperature is between 130 degrees Celsius and 160 degrees Celsius; and
       activate a controlled heating process for the sensor responsive to the calculated temperature being below the threshold temperature, the controlled heating process comprising activating the heater to heat the sensor.

12. The system of claim 11, wherein the threshold temperature is between 140 degrees Celsius and 150 degrees Celsius.

13. The system of claim 11, wherein the thermal model comprises a conductive heat transfer model when the exhaust mass flow is below a predetermined threshold.

14. The system of claim 13, wherein conductive heat transfer model comprises a heat power from an exhaust flow in an aftertreatment system, a heat power to the sensor, a radiation power to ambient, and a convection power to ambient.

15. The system of claim 11, wherein thermal model comprises a convective heat transfer model when the exhaust mass flow is above a predetermined threshold.

16. The system of claim 15, wherein convective heat transfer model comprises a heat power from an exhaust flow in an aftertreatment system, a heat power to an exhaust pipe, a radiation power to ambient, and a convection power to ambient.

17. The system of claim 11, wherein the controller is further configured to access a key-on parameter as an enablement condition.

18. The system of claim 11, wherein the thermal model is based on a calibration process to determine one or more calibration values for parameters of the thermal model.

* * * * *